Patented Dec. 16, 1952

2,622,102

UNITED STATES PATENT OFFICE 2,622,102

UNSATURATED CARBINOL AND PROCESS OF PREPARING SAME

Ronald Major Evans, Ickenham, England, assignor to Glaxo Laboratories Limited, Greenford, England, a British company No Drawing. Application July 31, 1950, Serial No. 176,911. In Great Britain August 18, 1949

10 Claims. (Cl. 260—631)

This invention is concerned with improvements in or relating to the preparation of a new unsaturated carbinol namely 3-methyl-1-(1'hydroxy-2':6':6'-trimethylcyclohexyl) octa-4:6-dien-1-yn-3-ol which may be represented by the following structural formula

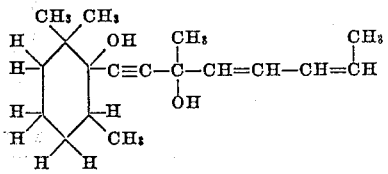

and which is useful in the synthesis of vitamin A and related compounds.

It has been found that the new carbinol can conveniently be prepared by reacting a halogeno magnesium derivative of 2:6:6-trimethyl-1-ethynylcyclohexan-1-ol with crotonylidene acetone in the presence of an inert solvent and subsequently decomposing the resulting complex formed; although it is not desired to limit the invention by any theoretical considerations it is believed that this reaction may be represented as follows:

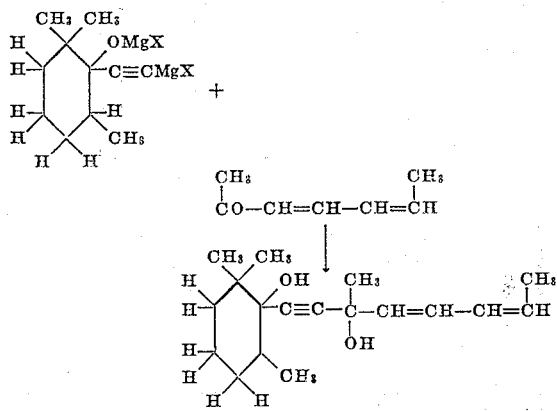

Accordingly the invention comprises the new carbinol 3-methyl-1-(1'-hydroxy-2':6':6'-trimethylcyclohexyl) octa-4:6-dien-1-yn-3-ol represented by the following formula

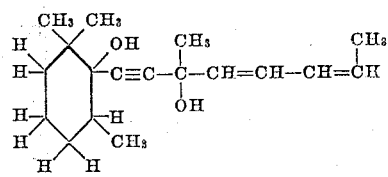

According to a further feature of the invention therefore there is provided a process for the preparation of a new unsaturated carbinol namely 3-methyl-1-(1'-hydroxy-2':6':6'-trimethylcyclohexyl) octa-4:6-dien-1-yn-3-ol in which a halogeno magnesium derivative of the general formula

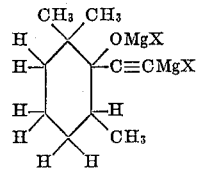

(where X is chlorine, bromine or iodine) is reacted with crotonylidene acetone in the presence of an inert solvent as herein defined and the resulting organo magnesium complex decomposed to yield the desired carbinol.

The term "inert solvent" as used herein means an organic solvent which has no demonstratable action on the reactants or the products of the reaction, other than the normal action of solvents in Grignard reactions. It is preferable to use aliphatic ethers and cyclic aliphatic ethers having from 4–10 carbon atoms, for example, diethyl ether, di-n-butyl ether, dioxan and tetrahydrofuran; other inert solvents such as benzene or anisole may be used alone or in conjunction with these solvents. It is also preferable that the solvent used should be as dry as possible.

The first stage of the process, namely the reaction of the halogeno magnesium derivative with the ketone, is preferably carried out at temperatures within the range of from —20° to +60° C. for several hours, preferably in an inert atmosphere, for example in an atmosphere of nitrogen. It is also generally desirable to have present a small quantity of an anti-oxidant, e. g. hydroquinone or α-tocopherol.

The second stage of the process namely the decomposition of the organo-magnesium complex may be carried out by conventional methods, for example by the use of water which may contain other reagents. The use of strongly acidic reagents in the decomposition should preferably be avoided. It is preferable to use an aqueous solution of ammonium chloride for the decomposition which may, for example be effected at or slightly below room temperature.

The halogeno magnesium derivative of 2:6:6-trimethyl-1-ethynylcyclohexan-1-ol may be prepared by conventional methods; it is preferable, according to a further feature of the invention to prepare this derivative by reacting 2:6:6-trimethyl-1-ethynylcyclohexan-1-ol with approximately 2 mols of an alkyl Grignard reagent, for example ethyl magnesium bromide, preferably at a temperature within the range of from 0–60° C. This reaction is also preferably effected in an inert atmosphere and in the same solvent as is used for the first stage of the process according to the invention.

The new carbinol in the purest form it has been possible to prepare has the following characteristics:

Boiling point, 100–110°/10⁻⁴ mm.
Refractive index ($n_D^{15°}$), 1.5240
Light absorption (n-hexane):
  Max. 2300 Å
  $E_{1\,cm.}^{1\%}$ 929
  $\epsilon$ 27,000

It will be readily understood that these characteristics will be liable to variation dependant on the purity of any particular sample of the new carbinol.

2:6:6-trimethyl-1-ethynylcyclohexan-1-ol may for example be prepared by the method described in Example 3 of British Patent No. 627,453.

In order that the invention may be well understood the following examples are given only as illustrations:

(All reactions in the following examples were carried out in an atmosphere of nitrogen.)

EXAMPLE 1

*3-methyl-1-(1'-hydroxy-2':6':6'-trimethylcyclohexyl) octa-4:6-dien-1-yn-3-ol*

2:6:6-trimethylethynylcyclohexan-1-ol (10 g.) in dry ether (24 cc.) was added dropwise to a cooled solution (0–5°) of ethyl magnesium bromide (prepared from 3.0 g. of magnesium in 150 cc. dry ether) containing a trace of hydroquinone over a period of 30 minutes. A gum was formed which adhered to the sides of the flask; refluxing for 30 minutes with rapid stirring caused fine dispersion of the gum and on cooling to 0° the Grignard complex separated as a fine grey powder. Crotonylidene acetone (6.6 g.) in dry ether (25 c. c.) was added gradually to the stirred Grignard reagent at 0° over a period of 1 hour. After stirring for a further period of 2 hours, during which time the temperature of the reactants was allowed to rise to room temperature, the complex was decomposed by the addition of ammonium chloride solution (20%; 250 cc.), the product was extracted with ether, the ethereal extract washed with saturated sodium bicarbonate solution and dried over anhydrous potassium carbonate.

Removal of the solvent and distillation of the product gave 3-methyl-1-(1'-hydroxy-2':6':6'-trimethylcyclohexyl) octa-4:6-dien-1-yn-3-ol (5.25 g.; 32%) as a viscous yellow liquid— B. P. 100°/10⁻⁴mm., $n_D^{14°}$ 1.5272. Found C, 78.3; H, 10.5 C₁₈H₂₈O₂ requires C, 78.2; H, 10.2%.

Light absorption: Maxima 2300 and 2730 Å

$E_{1\,cm.}^{1\%}$ 887 and 199

$\epsilon$ 24,400 and 5,300 respectively.

*Active hydrogen (Zerewitinoff).*—The glycol (111 mg.) evolved 20.2 cc. of methane at 21°/757 mm. equivalent to 2.1 atoms of hydrogen per molecule.

*Unsaturation.*—The glycol (31.8 mg.) on hydrogenation in ethyl acetate using a platinic oxide catalyst absorbed 8.6 cc. of hydrogen at 23°/759 mm. equivalent to 3.8 per molecule.

EXAMPLE 2

2:6:6-trimethyl-1-ethynylcyclohexan-1-ol (20 g.; 1 mol) in dry ethyl ether (50 c. c.) was added to a refluxing solution of ethyl magnesium bromide (2.4 mols) (prepared from 7.2 g. magnesium and 33.2 g. ethyl bromide in 400 c. c. of dry ethyl ether) with stirring over a period of 45 minutes. Stirring and refluxing was continued for a further hour, and the mixture then cooled to 20°. Crotonylidene acetone (19.9 g.; 1.5 mols) in dry ethyl ether (50 c. c.) was added to the solution with stirring during 1 hour. After stirring at 20° for a further 2 hours the mixture was cooled to 0°, and 20% ammonium chloride solution (500 cc.) added at such a rate that the temperature did not exceed 20°. The organic layer was separated, a little α-tocopherol added, and the ether evaporated under reduced pressure at less than 35°. The residue on distillation gave 3-methyl-1-(2':6':6'-trimethyl-1'-hydroxycyclohexyl)-octa-4:6-dien-1-yn-3-ol, B. P. 110°/10⁻⁵mm. (20.3 g.; 61%), $n_D^{15}$ 1.5240. Light absorption (n-hexane) maximum 2300 Å

$E_{1\,cm.}^{1\%}$ 878

$\epsilon$ 24,200.

EXAMPLE 3

2:6:6-trimethyl-1-ethynylcyclohexan-1-ol (10 g.) in dry n-butyl ether (25 cc.) was added dropwise to a stirred solution of methyl magnesium iodide (prepared from 3.0 g. of magnesium and 21.6 g. of methyl iodide in 150 c. c. of dry n-butyl ether) over a period of 30 minutes. The solution was warmed at 40° for one hour, cooled to −15° and a solution of crotonylidene acetone (6.7 g.) in dry n-butyl ether (50 c. c.) was added to the rapidly stirred solution over a period of one hour. After stirring for a further period of one hour at −10° (during which time a solid separated from the solution), the reaction mixture was allowed to warm up to room temperature. The complex was decomposed by the addition of N-ammonium hydroxide solution (100 c. c.), a small amount of α-tocopherol added as an antioxidant, the solution filtered and the ethereal layer separated and dried over anhydrous magnesium sulphate. Removal of the solvent and distillation of the residue gave pure 3-methyl-1-(2':6':6'-trimethyl-1'-hydroxycyclohexyl) octa-4:6-dien-1-yn-3-ol, (3.5 g.; 21%), B. P. 110°/10⁻⁵mm. $n_D^{14}$ 1.5240. Light absorption (n-hexane) maximum 2290 Å, $E_{1\,cm.}^{1\%}$ 979

$\epsilon$ 27,000.

EXAMPLE 4

2:6:6-trimethyl-1-ethynylcyclohexan-1-ol (10 g.) in dry dioxan (50 c. c.) was added dropwise to a solution of ethyl magnesium chloride (formed from 3 g. magnesium in dry ethyl ether 100 c. c.) over a period of 15 minutes during which time the Grignard complex separated as white solid. The stirred suspension was refluxed for one hour, the reaction mixture was cooled to 0° and crotonylidene acetone (6.7 g.) in dry dioxan (50 c. c.) was added over a period of one hour. Stirring was continued for a further period of one and a half hours and the temperature of the reactants was then allowed to rise to room temperature. The complex was decomposed by the addition of a saturated solution of ammonium chloride (100 c. c.), a small amount of α-tocopherol added as an antioxidant, the ethereal layer was separated and dried over anhydrous magnesium sulphate. Removal of the solvent and distillation of the product gave crude 3-methyl-1-(2':6':6' - trimethyl-1'-hydroxycyclohexyl) octa-4:6-dien-1-yn-3-ol, B. P. 100–110°/10⁻⁵mm. (2.8 g.; 17%) $n_D^{14}$ 1.5190. Light absorption (n-hexane) maximum 2290 Å

$E_{1cm}^{1\%}$ 310

ε 8,500.

EXAMPLE 5

2:6:6 - trimethyl-1-ethynylcyclohexan-1-ol (10 g.) in dry tetrahydrofuran (50 c. c.) was added dropwise to a stirred solution of ethyl magnesium bromide (prepared from 3.0 g. of magnesium and 14.0 g. of ethyl bromide in 100 cc. tetrahydrofuran) over a period of 30 minutes. The solution was warmed for one hour at 60° and then cooled to room temperature (20°) when a small amount of the Grignard complex separated as a fine crystalline solid. Crotonylidene acetone (7.0 g.) in tetrahydrofuran (50 c. c.) was added dropwise over a period of one hour and stirring continued for a further period of two hours, the solution remaining homogeneous throughout the reaction. The complex was then decomposed by the addition of water (50 c. c.) followed by saturated ammonium chloride solution (100 c. c.) a small amount of α-tocopherol added as antioxidant, the ethereal layer separated and dried over anhydrous sodium sulphate. Distillation of the product gave 3-methyl-1-(2':6':6-trimethyl-1' - hydroxycyclohexyl) octa - 4:6-dien-1-yn-3-ol (7.0 g.; 42%) B. P. 100–110°/10⁻⁵mm. $n_D^{14}$ 1.5340. Light absorption (n-hexane) maximum 2290 Å

$E_{1cm}^{1\%}$ 830

ε 23,000.

EXAMPLE 6

2:6:6 - trimethyl-1-ethynylcyclohexan-1-ol (20 g.) in dry ether (50 c. c.) was added dropwise to a stirred refluxing solution of ethyl magnesium bromide (prepared from 7.2 g. of magnesium and 33.2 g. of ethyl bromide in 400 c. c. of dry ether) over a period of 45 minutes. The refluxing mixture was stirred for one hour, crotonylidene acetone (13.2 g.) in dry ether (50 c. c.) added over a period of one hour, and reflux continued for a further period of two hours. After cooling to 0° the complex was decomposed by the addition of saturated ammonium chloride solution (500 c. c.) (the temperature not allowed to exceed 20°), a small amount of α-tocopherol added as antioxidant and the ethereal layer separated. The solvent was removed under reduced pressure at less than 35° and distillation of the residue gave crude 3-methyl-1-(2':6':6'-trimethyl-1'-hydroxycyclohexyl)octa - 4:6-dien-1-yn-3-ol B. P. 100–110°/10⁻⁵ mm. 12.0 g. (36%) $n_D^{15}$ 1.5296.

Light absorption (n-hexane) maximum 2290 Å

$E_{1cm}^{1\%}$ 637

ε 17,600.

I claim:

1. As a new compound, 3-methyl-1-(1'-hydroxy - 2':6:6' - trimethylcyclohexyl)octa - 4:6-dien-1-yn-3-ol represented by the following structural formula

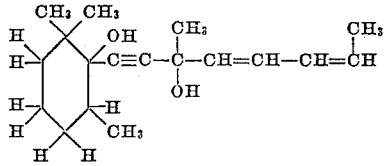

2. A process for the preparation of 3-methyl-1-(1' - hydroxy - 2':6':6' -trimethylcyclohexyl)-octa 4:6-dien-1-yn-3-ol which comprises first reacting a halogeno magnesium derivative of the general formula

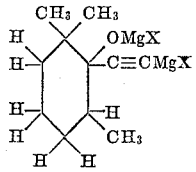

where X is selected from the group consisting of chlorine, bromine and iodine with crotonylidene acetone in the presence of an inert solvent selected from the group consisting of aliphatic and cyclic aliphatic ethers having from 4–10 carbon atoms at a temperature within the range of from −20° to +60° C. and then decomposing the resulting organo magnesium complex with water to yield the desired carbinol.

3. A process as claimed in claim 2 in which the inert solvent is diethyl ether.

4. A process as claimed in claim 2 in which the inert solvent is di-n-butyl ether.

5. A process as claimed in claim 2 in which the inert solvent is dioxan.

6. A process as claimed in claim 2 in which the inert solvent is tetrahydrofuran.

7. A process as claimed in claim 2 in which the reaction is carried out in an inert atmosphere and in the presence of an anti-oxidant.

8. A process for the preparation of a 3-methyl-1 -(1'-hydroxy - 2':6':6' - trimethylcyclohexyl)-octa-4:6-dien-1-yn-3-ol which comprises first reacting 2:6:6-trimethyl-1-ethynylcyclohexan-1-ol with approximately 2 mols of an alkyl Grignard reagent in an inert solvent selected from the group consisting of aliphatic and cyclic aliphatic ethers containing from 4–10 carbon atoms then reacting the product with crotonylidene acetone in the presence of said inert organic solvent and at a temperature within the range of from −20° to +60° C. and then decomposing the resulting organo magnesium complex with aqueous ammonium chloride to yield the desired carbinol.

9. A process as claimed in claim 8 in which the said alkyl Grignard reagent is ethyl magnesium bromide.

10. A process as claimed in claim 8 in which the reaction of 2:6:6-trimethyl-1-ethynylcyclohexan-1-ol with the alkyl Grignard reagent is carried out at a temperature of from 0–60° C. in an inert atmosphere.

RONALD MAJOR EVANS.

REFERENCES CITED

The following references are of record in the file of this patent:

UNITED STATES PATENTS

| Number | Name | Date |
|---|---|---|
| 2,475,139 | Isler et al. | July 5, 1949 |
| 2,531,567 | Heilbron et al. | Nov. 28, 1950 |
| 2,579,658 | Evans | Dec. 25, 1951 |
| 2,591,811 | Heilbron et al. | Apr. 8, 1952 |

FOREIGN PATENTS

| Number | Country | Date |
|---|---|---|
| 627,453 | Great Britain | Aug. 9, 1949 |

OTHER REFERENCES

Milas et al., Jour. Amer. Chem. Soc., vol. 70, pp. 1829–34 (May 1948) (6 pp.)

Heilbron et al., J. Chem. Soc. (England), August 1949, pp. 2023–27.